Figure 1:
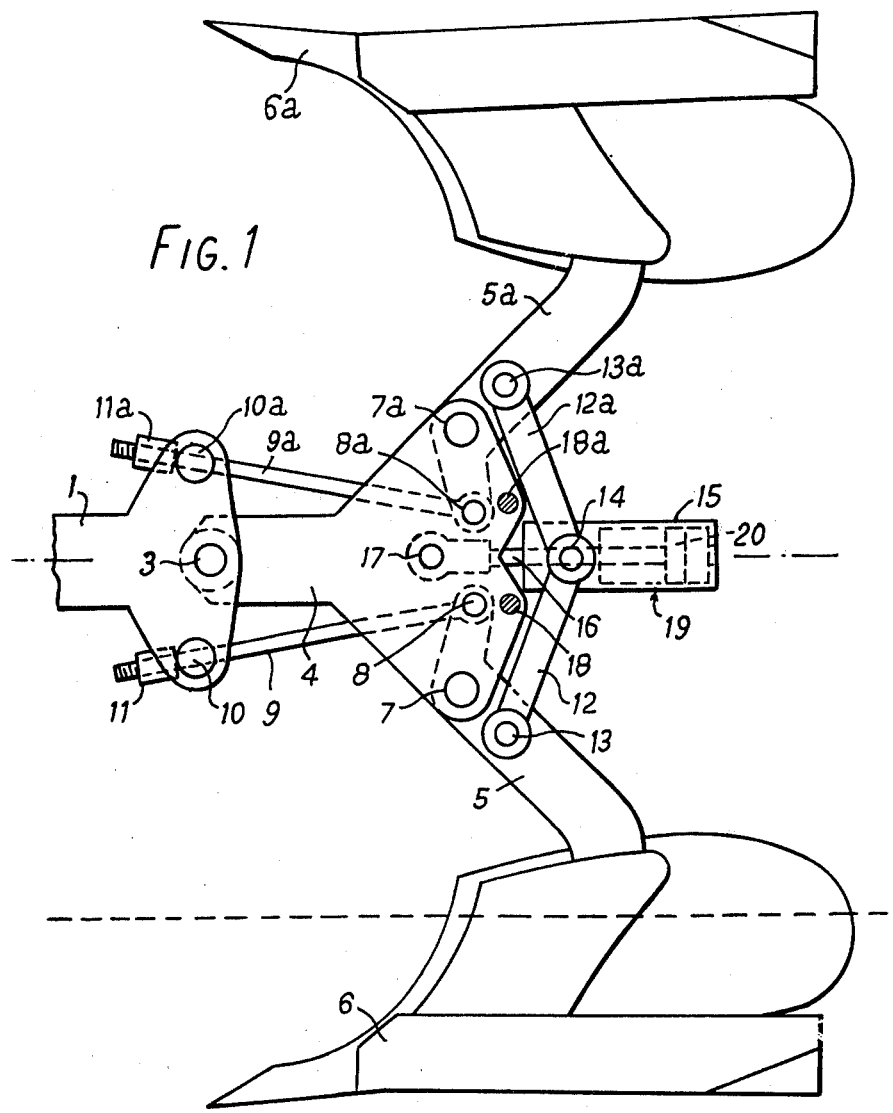

United States Patent [19]

Revett et al.

[11] 4,189,007
[45] Feb. 19, 1980

[54] REVERSIBLE PLOUGHS

[75] Inventors: Raymond H. Revett, Ipswich; Frederick G. Pavely, Felixstowe, both of England

[73] Assignee: Ransomes Sims & Jefferies Limited, Sufflok, England

[21] Appl. No.: 881,546

[22] Filed: Feb. 27, 1978

[30] Foreign Application Priority Data

Feb. 28, 1977 [GB] United Kingdom ............... 8347/77

[51] Int. Cl.$^2$ .................. A01B 3/28; A01B 61/02
[52] U.S. Cl. .................. 172/224; 172/263
[58] Field of Search ............ 172/224, 261, 263, 264, 172/265, 266, 267, 268

[56] References Cited

U.S. PATENT DOCUMENTS 3,202,223  8/1965  Fulton .................. 172/264
3,565,180  2/1971  Arnold et al. .................. 172/265

FOREIGN PATENT DOCUMENTS 2537175  2/1977  Fed. Rep. of Germany .......... 172/261
2293863  7/1976  France .................. 172/224

*Primary Examiner*—George J. Marlo
*Attorney, Agent, or Firm*—Ira Milton Jones

[57] ABSTRACT

A reversible plough comprises a frame member, at least one support member pivotally mounted on the frame member and two cranked plough legs pivotally mounted on the support member, and biassed toward their operative positions, in which during normal ploughing operations the support member is held in its operative position, but when an obstacle is encountered by the plough body and the working plough leg deflected, the support member is permitted to rotate relative to the frame member.

10 Claims, 3 Drawing Figures

REVERSIBLE PLOUGHS

This invention relates to reversible ploughs in which the plough bodies are able to rise to avoid obstructions in the ground, the plough bodies being automatically returned into work once the obstruction has been cleared.

Such ploughs have been produced hitherto, but have in the main been unable to operate correctly in cases where the plough body is subjected to large downwardly directed forces such as those set up by the engagement of the plough point with the underside of an obstruction in the ground. The relatively few prior proposals which have sought to overcome this problem have been characterised by a variation in the resistance to displacement of the plough body which is far from ideal. It is an object of the present invention to provide an improved reversible plough in which these disadvantages are overcome.

The present invention consists in a reversible plough comprising a frame member reversible between left and right handed ploughing positions thereof; at least one support member pivoted to the frame member for rotation in a plane which is vertical at both of said ploughing positions; two plough legs each pivotally mounted on the support member for rotation in a plane parallel to said plane and for carrying respective left and right hand plough bodies; biassing means for urging, in use, the plough legs towards respective operative positions in which a different plough body is disposed for earth working operations at each ploughing position and stabiliser means connected between the frame member and the plough legs to inhibit said rotation of the support member when the legs are in their operative positions and to enable rotation of the support member when, in use, the earth working body is deflected from its operative position by an obstruction in the ground.

Preferably, the stabiliser means comprises means for maintaining within predetermined limits the separation of a point on each leg and a corresponding location in the frame member.

Suitably, the stabiliser means comprises an element such as a rod or a chain connected between said point of the leg and the corresponding location in the frame member, each element being in tension when the associated leg is in its operative position.

In a preferred form of the invention, the biassing means acts between the support member and each plough leg, rotational movement of the support member once enabled being unopposed by the biassing means.

Figure 2:
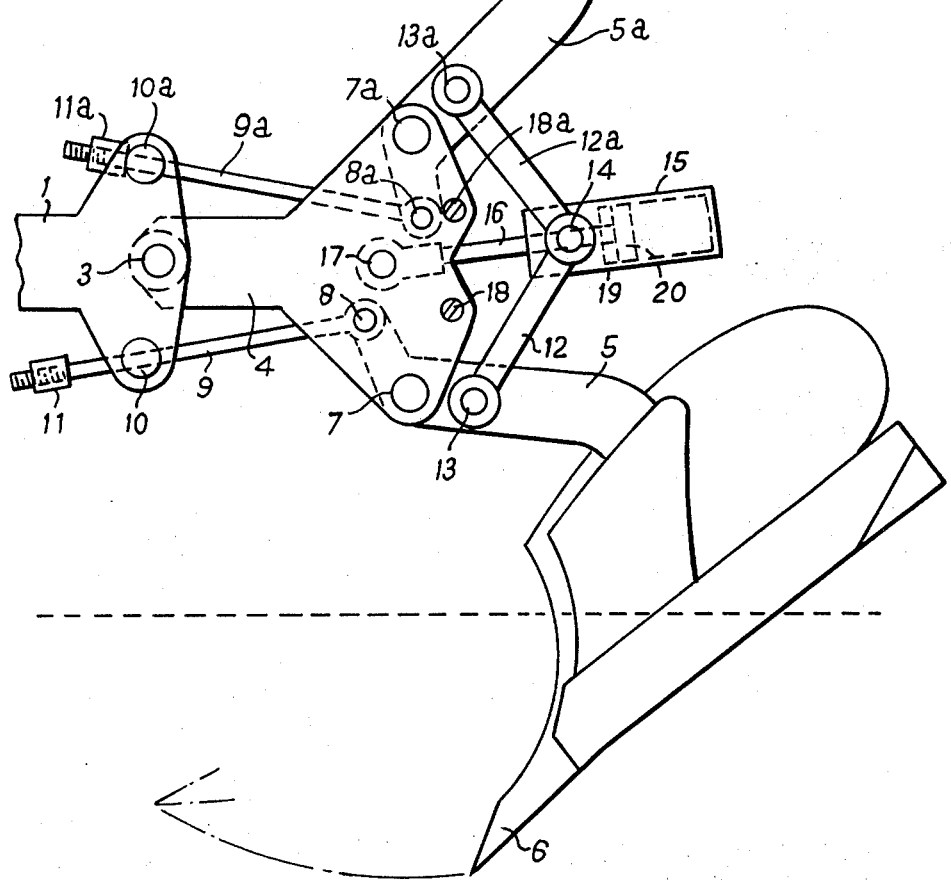
Figure 3:
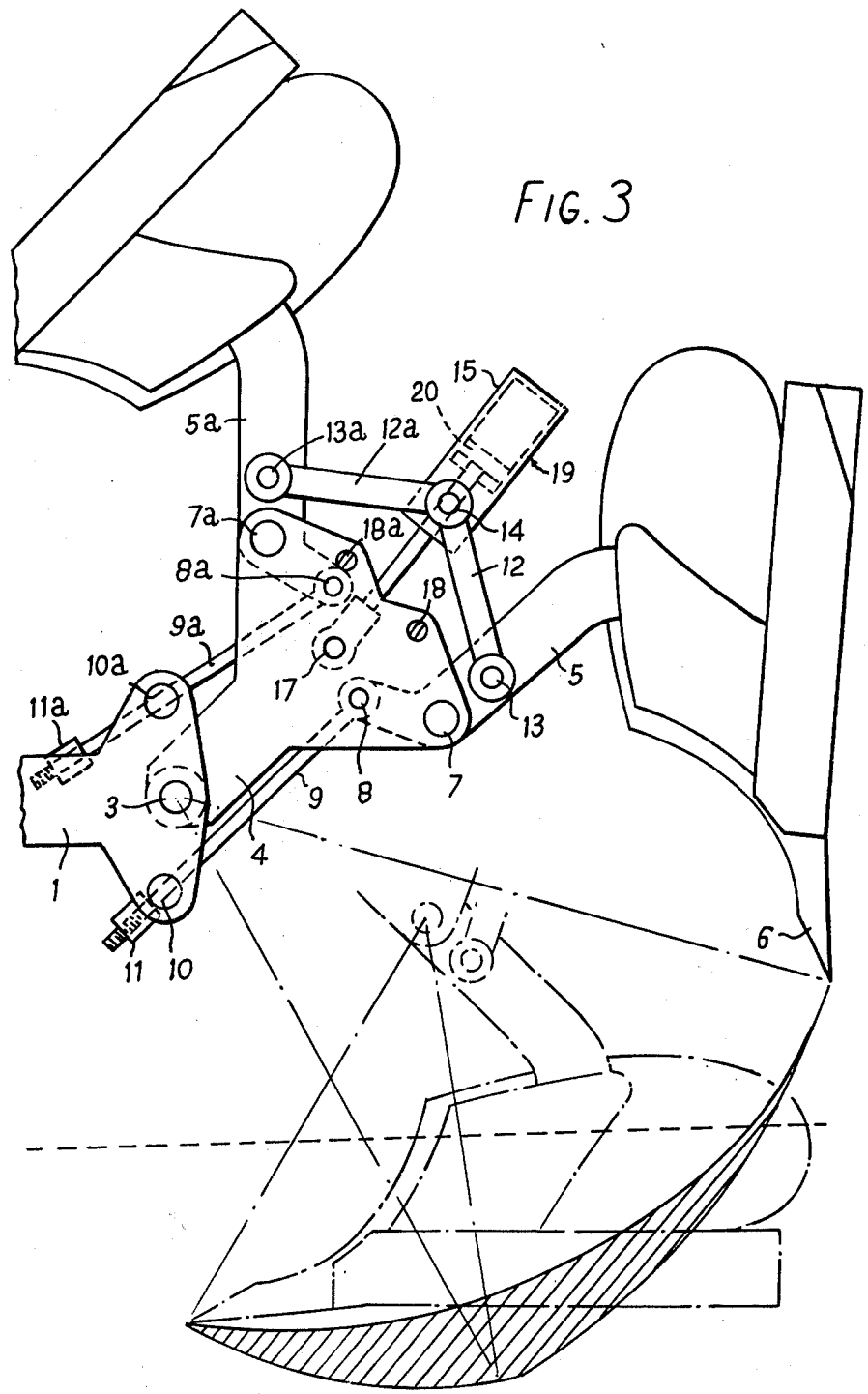

The invention will now be described by way of example with reference to the accompanying drawings in which FIGS. 1, 2 and 3 show a part of a reversible plough according to the invention, in three different positions.

A frame member 1 forms part of, or is attached to, a plough frame of any suitable construction adapted to be drawn by a tractor. Suitable means are provided, but not shown, for reversing the frame member 1 through approximately 180° from the right handed ploughing position shown in the drawings in which right handed plough body 6 is disposed for earth working operations, to a corresponding left handed ploughing position in which left handed plough body 6a is disposed for earth working operations. The frame member 1 provides pivotal mounting at 3 for a support member 4, and the number of these support members in a reversible plough according to this invention is of course determined by the number of pairs of associated plough bodies. Two cranked plough legs 5, 5a are pivoted at their respective elbows to the support member 4 at vertically spaced locations 7, 7a. A longer arm of each cranked plough leg 5, 5a extends away from the support member 4 to provide mounting for a plough body 6, 6a, with, as is customary, plough body 6 being right handed and plough body 6a being left handed. The shorter arms of the two cranked plough legs project inwardly of the support member 4 and, at their inner ends are pivotally connected at 8, 8a to respective stabiliser rods 9 and 9a. These rods 9, 9a project forwardly and are slidably engaged within respective swivel joints 10 and 10a pivotally mounted at vertically spaced locations to the frame member 1. The forward ends of the two rods 9, 9a are screw-threaded to receive adjustable stops 11, 11a.

A hydraulic ram 19 has its piston rod 16 pivotally connected to the support member 4 at 17. The cylinder 15 of the ram is provided with a trunnion 14 to which are pivotally connected the inner ends of two links 12 and 12a. The outer ends of these two links are pivotally connected to the respective plough legs 5, 5a at 13, 13a. Two fixed stops 18, 18a are provided on the support member 4 adjacent the shorter arms of the cranked plough legs 5 and 5a respectively.

In use, hydraulic ram 19 is connected to a hydraulic accumulator suitably mounted on the plough frame, with the effect that the volume in the cylinder 15 forwardly of the piston 20 is pressurised. The consequent forwardly directed force on cylinder 15 is transmitted through trunnion 14 and links 12, 12a to the plough legs 5, 5a resulting in a turning moment of each plough leg about its corresponding pivotal mounting 7, 7a putting the corresponding rod 9, 9a into tension. This tension is sufficient to stabilise the support member 4 in the position shown in FIG. 1 with the two plough legs 5 and 5a in their respective operative positions. Whilst the two plough legs remain in their operative positions, and they are urged towards those positions by the ram 15, the support member is prevented from rotating with respect to the frame member 1. The adjustable stops 11 and 11a can be moved longitudinally of the corresponding rods 9, 9a to centralise the support member 4 on the frame member 1, and to individually adjust the pitch of the plough bodies 6, 6a.

If the earth working body 6 encounters an obstacle in the ground the impact load on the plough body will overcome the resistance offered by the toggle formed by links 12, 12a and the hydraulic pressure in ram 15 connected between the joint of that toggle and the support member 4. The plough leg 5 will consequently pivot anticlockwise about pivot point 7 as shown in FIG. 2, with hydraulic fluid being displaced from the cylinder to the hydraulic accumulator. As the shorter arm of plough leg 5 rotates the associated rod 9 will be displaced forwardly thus moving stop 11 away from the swivel 10. This loss of contact between the adjustable stop 1 and the swivel joint 10 enables the support member 4 to rotate upwardly as the point of plough body 6 rides over the obstruction. Tension is released in the upper rod 9a as the support member 4 begins to rotate, thus allowing the shorter arm of leg 5a to rotate about pivot point 7a until contact is made with stop 18a, which is positioned just clear of the plough leg during normal work. Contact of the shorter arm of plough leg 5a with stop 18a provides a toggle stop and allows further movement of parts associated with right hand ploughing only. As the plough body 6 is forced upwardly by the obstruction the support member 4 will continue to rotate about pivot point 3 until the position shown in FIG. 3 is reached, which corresponds to maximum extension of the ram 19. It will be appreciated that once the tension has been released in rod 9 by an initial rotation of plough leg 5, the support member may pivot without opposition from the ram 19. In normal circumstances the pivotal movement of the plough leg 5 with respect to the support member 4, and the pivotal movement of support member 4 with respect to frame member 1, which movements are indicated in FIG. 3 by radii in chain lines, will occur simultaneously, with the magnitude of the swing back and lift being governed by the size and resistance of the obstruction. The point of plough body 6 will in practice describe any one of a number of paths falling within the shaded area of FIG. 3, with the typical earth line being shown dotted. Once the obstacle has been cleared, pressure in the hydraulic accumulator will return hydraulic fluid to the hydraulic ram 19 forwardly fo the piston 20 so returning the plough legs 5, 5a to the operative positions shown in FIG. 1 through the action of the toggle. It will be understood from the symmetry of the mechanism that the behaviour when the frame member 1 is in its left handed ploughing position when the left handed plough body 6a disposed for earth working operations, will be completely analogous with the behaviour described above.

Since the plough body can move about either or both of two centres of rotation, the likelihood of the plough body becoming hooked under an obstruction such as a tree trunk which subjects the plough body to large vertically downward forces is much reduced. The resistance offered by the toggle comprising links 12 and 12a and the hydraulic ram 19 can be adjusted to give variable point loads to suit variable soil conditions. In the normal orientation of the mechanism, the support member is positively located in the central position by the tension in the stabiliser rods 9 and 9a. The two legs are biassed toward their operative positions by the hydraulic ram and the resistance to displacement of these legs and the associated bodies from the operative positions can be made sufficiently high, taking into account such factors as the ploughing conditions, to prevent or at least substantially to minimise spurious tripping of the plough legs. However, once the working plough body is displaced, the support member is free to rotate without hindrance from the hydraulic ram and the resistance to movement of the plough body need not increase to a substantial degree as the plough body continues to move upwardly.

This invention has been described by way of example only and other means could be employed for stabilising the support member 4 against rotation when the plough legs 5, 5a are in their operative positions, but enabling rotation of that support member when the working plough body is deflected by an obstacle. Each rod 9, 9a could, for example, be pivotally secured to the frame member 1 and slidably mounted with respect to the corresponding plough leg 5, 5a. As a further alternative, the rods might be replaced by other elements capable of acting in tension, such as wires or chains. It will also be appreciated that with suitable variations in the geometry of the mechanism, it would be possible to use rods in compression to stabilise the support member when the two plough legs are in their operative positions, the separation of that point on each leg and the corresponding location in the frame member which are slidably connected by the compression rod, then increasing when a plough body is deflected, releasing the compression to permit rotation of the support member. It will be understood that with either tension or compression elements used as described, the effect is that the separation of a point on each plough leg and the corresponding location in the frame member is maintained within limits so that movement of the support member can only occur when accompanied by movement of a plough leg relatively to the support member. In a further modification the arrangement of a toggle and hydraulic ram which urges the two plough legs towards their respective operative positions could be replaced by a mechanical spring arrangement suitably coupled between the plough legs and the support member.

We claim:

1. A reversible plough comprising a frame member reversible between left and right handed ploughing positions thereof; at least one support member pivoted to the frame member for rotation in a plane which is vertical at both of said ploughing positions; two plough legs each pivotally mounted on the support member for rotation in a plane parallel to said plane and for carrying respective left and right hand plough bodies; biassing means for urging, in use, the plough legs towards respective operative positions in which a different plough body is disposed for earth working operations at each ploughing position; and stabiliser means connected between the frame member and the plough legs to hold the support member against rotation relative to the frame member whilst the plough legs are in their respective operative positions, the stabiliser means permitting rotation of the support member relative to the frame member when the plough leg associated with the working plough body is deflected from its operative position through engagement of the working plough body with an obstruction in the ground.

2. A reversible plough according to claim 1, wherein the stabiliser means comprises means for maintaining within predetermined limits the separation of a point on each leg and a corresponding location in the frame member.

3. A reversible plough according to claim 2, wherein the stabiliser means comprises an element connected between said point of each leg and the corresponding location in the frame member, each element being in tension when the associated leg is in its operative position.

4. A reversible plough according to claim 2 wherein the stabiliser means comprises a rod connected between said point of each leg and the corresponding location in the frame member and being slidable between limits longitudinally of the rod with respect to the associated plough leg or the frame member.

5. A reversible plough according to claim 4, wherein each rod is pivotally connected at one end thereof to the associated plough leg and is slidably engaged within a swivel joint carried on the frame member, a stop being provided at the end of the rod remote from the plough leg.

6. A reversible plough according to claim 3, wherein the plough legs are cranked and are mounted on the support member at their respective elbows, the associated element being connected to the end of the plough leg remote from the plough body.

7. A reversible plough according to claim 1, wherein the biassing means acts between the support member and each plough leg, rotational movement of the support member once enabled being unopposed by the biassing means.

8. A reversible plough according to claim 7, wherein the biassing means comprises a pair of jointed links respectively connected at their free ends with the plough legs, and a biassing element connected between the support member and the junction of the two links.

9. A reversible plough according to claim 8 wherein the biassing element comprises a hydraulic ram.

10. A reversible plough according to claim 7, wherein a fixed stop is provided in the support member to prevent each plough leg from being rotated beyond its operative position by the biassing means.

* * * * *